Nov. 20, 1962 R. A. PETRUSEK 3,064,859
LIQUID MEASURING MEANS
Original Filed Oct. 9, 1956 2 Sheets-Sheet 2

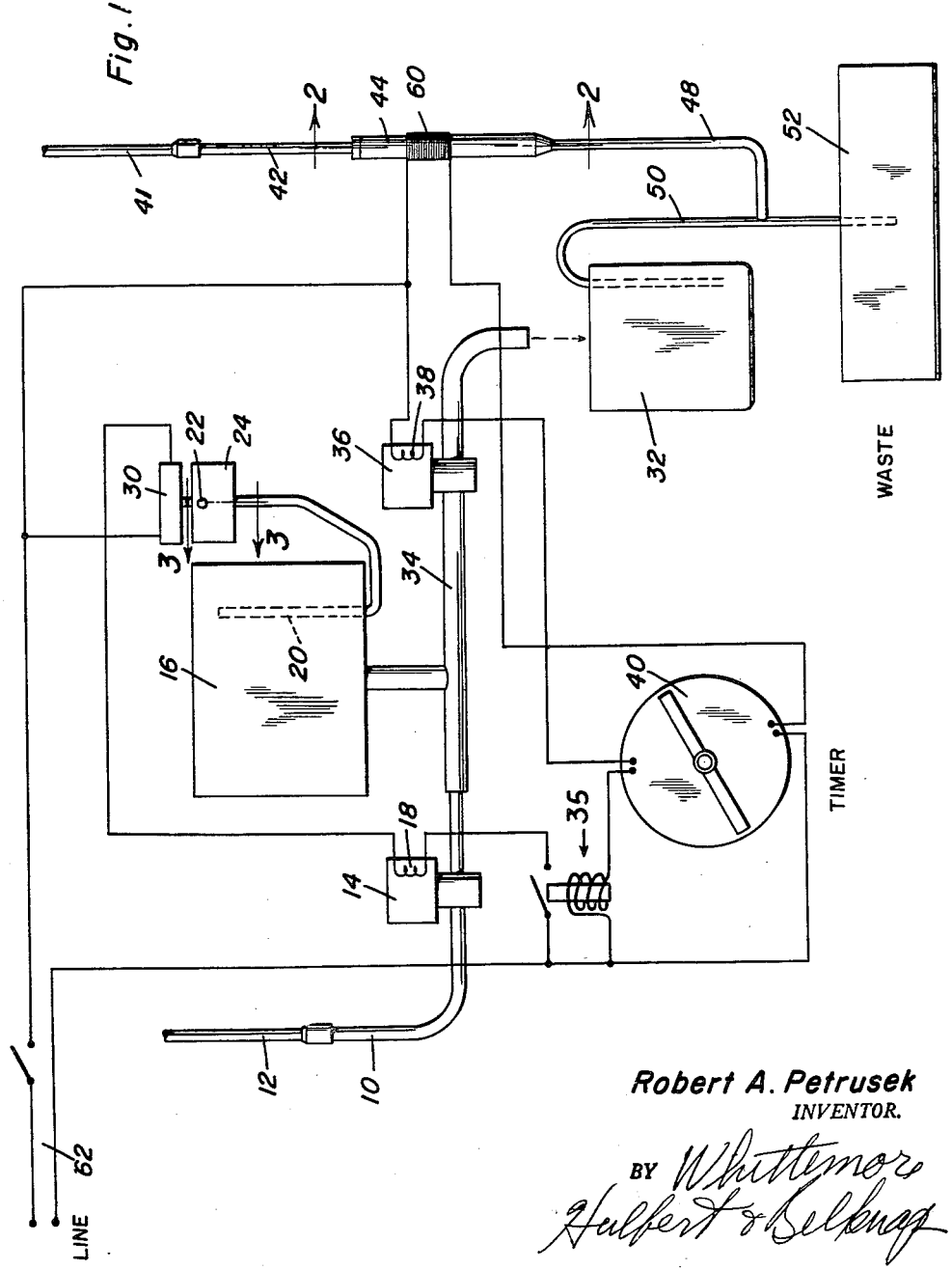

Robert A. Petrusek
INVENTOR.

BY
ATTORNEYS

3,064,859
LIQUID MEASURING MEANS
Robert A. Petrusek, Steenson Hollow, Rte. 1, Sheffield, Ala.
Original application Oct. 9, 1956, Ser. No. 614,894, now Patent No. 2,971,647, dated Feb. 14, 1961. Divided and this application Feb. 9, 1960, Ser. No. 7,583
5 Claims. (Cl. 222—69)

The present invention relates to liquid measuring means, and more particularly, to means designed automatically to measure out a predetermined quantity of liquid.

The present application is a division of my prior co-pending application Serial No. 614,894, filed October 9, 1956, now Patent No. 2,971,647, of February 14, 1961.

It is an object of the present invention to provide measuring means of the type aforesaid comprising a reservoir, a vent tube connected to the interior of said reservoir and extending upwardly along the outside of the reservoir to a float chamber including a switch actuating float.

More specifically, it is an object of the present invention to provide a reservoir, a valve controlling flow of liquid into the reservoir, a float movable in accordance with the level of liquid in the reservoir, and a circuit for controlling said valve including a switch actuated by said float when the level of liquid in said reservoir reaches a predetermined level.

More specifically, it is an object of the present invention to provide liquid measuring apparatus including a closed reservoir having a fluid connection to the bottom thereof, a float chamber located laterally from said reservoir and having a fluid connection thereto, an air vent for said float chamber, a float in said chamber, switch means adapted to be actuated by said float upon attainment of a predetermined liquid level in said reservoir, and means including said switch for terminating the addition of water to said reservoir when the liquid therein reaches a predetermined level.

Other objects and features of the invention will become apparent as the description proceeds, especially when taken in conjunction with the accompanying drawings, illustrating a preferred embodiment of the invention, wherein:

FIGURE 1 is a diagrammatic view of a system which includes liquid measuring apparatus constructed in accordance with the present invention.

Figure 3:
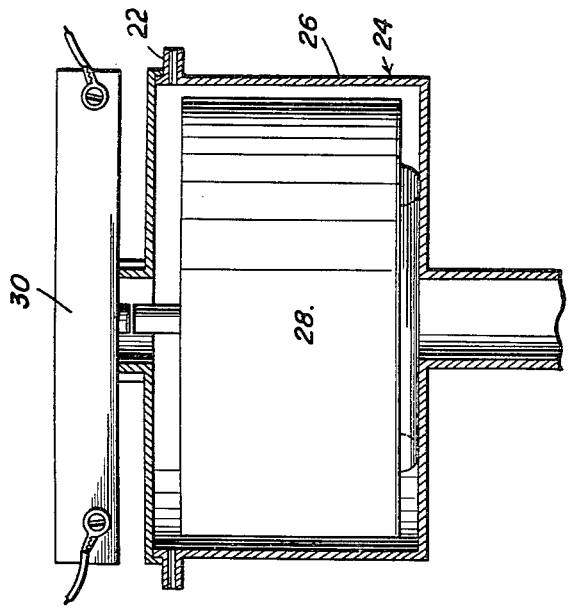
FIGURE 3 is an enlarged sectional view on the line 3—3, FIGURE 1.

While the liquid measuring apparatus of the present invention is capable of many diverse uses, a typical use is in a system devised for removing clay particles from a mixture of clay and sand, and the liquid measuring apparatus will be described in conjunction with this system.

The determination of clay content of molding sand in foundries and foundry laboratories is performed by the use of Standard American Foundry Society clay content testers. Clay is defined by the American Foundry Society as anything that will not settle in still water at a rate faster than one inch per minute. In using the standard clay content tester, a sample of molding sand is placed in a dry cylinder and suitable distilled water is added to fill the cylinder to a proper height. The mixture of clay, sand and water is agitated and allowed to settle for a suitable period. At the end of this period, the laboratory technician performing the test syphons off a suitable amount of the fluid, depending on the period during which the mixture has been allowed to settle, and then refills the cylinder to a proper height and subsequently allows the mixture to again settle. Sufficient stirring action is accomplished by the water as it is poured into the cylinder. At the end of the next interval, water is again syphoned off and more water is added. This cycle of pouring distilled water into the cylinder, allowing the mixture of sand, clay and water to settle for a period and then syphoning off a suitable amount of the water and starting the cycle over continues until the mixture is clear, not murky. This phase of the test may require a considerable expenditure of time and effort on the part of the laboratory technician whose presence is necessary for correct timing and syphoning action. Once the mixture is clear, the excess water is drawn off and the sand dried and weighed. The loss in weight is reported as clay content. The present invention eliminates the necessity for the presence of the laboratory technician during the various cycles of adding water and then syphoning the water off.

The present invention is more particularly concerned with the measuring reservoir and controls therefor. However, for a full understanding, the entire system will be briefly described.

With continuing reference to the accompanying drawings, wherein like reference numerals designate similar parts throughout the various views, and with initial attention directed to FIGURE 1, it will be noted that there is provided an intake conduit 10 which is adapted to be connected through a rubber hose 12 or any other suitable connector to a source of distilled water such as a water jug or the like. A solenoid actuated valve 14 is provided in the conduit 10 for controlling the flow of fluid through the conduit 10 to a closed reservoir 16. The solenoid type valve 14 is of conventional construction and is controlled by means of excitation of coil 18.

When the valve 14 is opened, flow of fluid through the conduit 10 will cause the reservoir 16 to become filled. Entrapped air in the reservoir 16 will pass out through conduit 20 and thence out of an opening, as at 22, formed in a valve actuator 24 to which the conduit 20 is connected. As can be seen best in FIGURE 3, the valve actuator 24 includes a housing 26 having a float 28 mounted therein. The float, as clearly illustrated in FIGURE 3, has a horizontal cross-sectional area only slightly less than that of the float housing. There is also provided a micro-switch 30 which is operated upon the rise of the float 28. When, by gravity flow through the conduit 10, the reservoir 16 becomes filled with fluid, the fluid will flow through the conduit 20 and into the housing 26, causing the float 28 to rise and actuating the micro-switch 30. When the micro-switch 30 is actuated, the circuit through the coil 18 will be interrupted closing the valve 14, cutting off the flow of distilled water into the reservoir 16 and into the housing 26.

Connecting the reservoir 16 with a receptacle 32 formed by the Standard American Foundrymen Society tester is a conduit 34. The receptacle 32 is located directly below the outlet of the conduit 34. A solenoid valve 36, similar to the solenoid valve 14 and controlled by excitation of the coil 38, controls flow of fluid through the conduit 34 and, like the valve 14, the valve 36 is controlled by any suitable timing means, such as the timer 40. When the proper time arrives to fill the receptacle 32, the timer 40 opens the solenoid valve 36 and distilled water in the reservoir 16 flows out into the receptacle 32 through conduit 34. Water in the housing 24 drains back to the reservoir 16. Since this flow of fluid out of the reservoir 16 would cause the micro-switch 30 to cause the valve 14 to open, a simple relay 35 is employed in a series type electrical connection which prevents the valve 14 from opening whenever the valve 36 is open.

Figure 2:
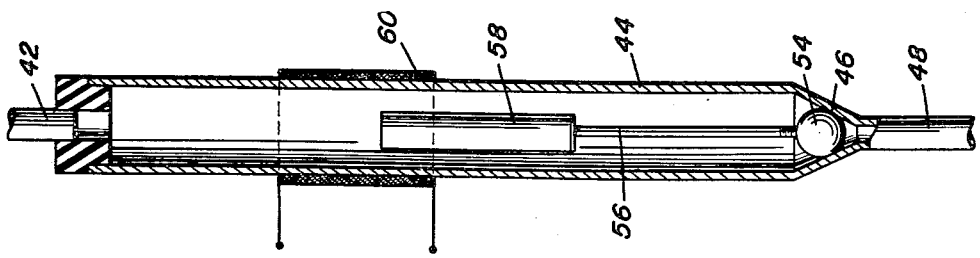
FIGURE 2 is an enlarged sectional view on the line 2—2, FIGURE 1, showing a syphon used in the complete system.

Valve 36 remains open for a suitable period as determined by the timer, after which time it closes. The valve 14 then opens so as to fill the reservoir 16. The timer permits a suitable period to elapse, after which the valve 36 closes. At the end of this interval, a suitable vacuum apparatus of any convenient construction is actuated and this vacuum-inducing apparatus (not shown) may be controlled by the timer 40 or any other suitable timing means. The vacuum-inducing apparatus may be connected by a suitable hose 41 to a conduit 42 which is connected to a cylindrical member 44 forming the main syphoning means of the invention. This syphoning means, which can be best seen in FIGURE 2, includes the cylindrical valve chamber 44 which has a valve seat 46 which may be integrally formed therewith and which has a conduit 48 connecting the chamber 44 to a conduit 50 which extends into the receptacle 32 a predetermined distance so as to assure that a given amount of fluid in the receptacle 32 will be syphoned off due to the action of the syphoning means. An overflow tank 52 is of course provided.

Within the chamber 44 is a valve member 54 which may be made of soft rubber, or the like, and which is connected by means of a rod 56 to a soft iron core 58 which is adapted to be actuated by a coil 60 connected to the source of electrical supply, as at 62, and which is controlled by the timer 40 or any other convenient timing means. When the valve 54 is lifted off the valve seat 56, the vacuum-inducing means can cause syphoning action and the withdrawal of fluid from the receptacle 32.

The cycle of operation repeats after each given interval so that, after each settling period, a known amount of fluid is added to the receptacle 32 and then syphoned off to a predetermined level, thereby removing and automatically washing the sand until the clay content thereof has been removed.

The operation of the reservoir 16, float chamber 24, switch 30, solenoid actuated inlet and outlet valves 14 and 36, timer 40, and relay 35 is now believed apparent.

The system operates automatically to collect exactly measured quantities of water in the reservoir 16, and to discharge them at intervals to the receptacle 32. The relay 35 prevents opening of inlet valve 14 while outlet valve 36 is open, but allows instantaneous opening of the inlet valve when the outlet valve closes so as to refill the reservoir with its measured charge of water. The float 28 is movable in a substantially closed separate float chamber in which the water level is the same as in the reservoir. The reservoir 16 is closed so that the measured charges of water, or other liquid, where the system is used for other purposes, is protected from the air.

The drawings and the foregoing specification constitute a description of the improved liquid measuring means in such full, clear, concise and exact terms as to enable any person skilled in the art to practice the invention, the scope of which is indicated by the appended claims.

What I claim as my invention is:

1. Apparatus for measuring out and discharging accurately controlled quantities of liquid, comprising a reservoir having a liquid inlet connection, a liquid outlet connection near the bottom thereof, and a flow passage having an inlet port within said reservoir at the desired upper level of liquid therein and a portion exterior of said reservoir, said reservoir except for said inlet and outlet connections and said flow passage being sealed whereby when said inlet connection is open and said outlet connection is closed, liquid flows into said receptacle and displaces air through said passage until the level of liquid in said reservoir reaches the inlet port of said passage and thereafter liquid is displaced through said passage, and when said inlet connection is closed and said outlet connection is open liquid flows by gravity out of said reservoir, and air is admitted to said reservoir solely through said passage, a float housing located laterally of said reservoir, said flow passage connecting to the bottom of said float housing, a float in said float housing adapted to rest on the bottom of said housing and having limited clearance with respect to the side and bottom walls thereof so that admission of a small quantity of liquid causes vertical movement of said float, switch means operably associated with said float and actuated by limited movement thereof away from the bottom of said housing, and a solenoid actuated inlet valve in said inlet connection adapted to be closed upon actuation of said switch by upward movement of said float.

2. Apparatus as defined in claim 1 comprising a solenoid actuated outlet valve in said outlet connection, a circuit in control of said outlet valve including a relay effective to prevent opening of said inlet valve by actuation of said switch means upon downward movement of said float while said outlet valve is open.

3. Apparatus for measuring out and discharging accurately controlled quantities of liquid, comprising a reservoir having a liquid inlet connection, a liquid outlet connection near the bottom thereof, and a flow passage having an inlet port within said reservoir at the desired upper level of liquid therein and a portion exterior of said reservoir, said reservoir except for said inlet and outlet connections and said flow passage being sealed whereby said inlet connection is open and said outlet connection is closed, liquid flows into said receptacle and displaces air through said passage until the level of liquid in said reservoir reaches the inlet port of said passage and thereafter water is displaced through said passage, and when said inlet connection is closed and said outlet connection is open liquid flows by gravity out of said reservoir, and air is admitted to said reservoir solely through said passage, a float housing located laterally of said reservoir, said flow passage connecting to the bottom of said float housing, a float in said float housing having limited clearance with respect to the side and bottom walls thereof so that admission of a small quantity of liquid causes vertical movement of said float, and switch means operably associated with said float and actuated by limited movement thereof away from the bottom of said housing, a solenoid actuated inlet valve in said inlet connection adapted to be closed upon actuation of said switch by upward movement of said float, a solenoid actuated outlet valve in said outlet connection, a timer for periodically actuating said outlet valve to open the same, and a switch actuated by opening of said outlet valve effective to prevent opening of said inlet valve by actuation of said float controlled switch means while said outlet valve is open.

4. Apparatus for accumulating accurately metered quantities of liquid and discharging it, comprising a reservoir having an inlet passage, and outlet passage and a float connection passage connected thereto, said outlet passage having a port opening within said reservoir adjacent the bottom thereof, said float connection passage having a port within said reservoir at the desired upper level of liquid therein, a normally closed solenoid actuated inlet valve in said inlet passage, a normally closed solenoid actuated outlet valve in said outlet passage, a float chamber located laterally and exteriorly of said reservoir, said float connection passage being connected to the lower part of said float chamber, a float in said chamber, a normally open switch in series with the solenoid of said inlet valve and located in position to be actuated to closed position upon a rise of said float, a timer switch for periodically energizing the solenoid of said outlet valve for a short interval to open said outlet valve to provide for emptying said reservoir by gravity flow, and a relay having its winding in series with the solenoid of said outlet valve and normally closed contacts in series with the solenoid of said inlet valve to prevent opening of said inlet valve while said outlet valve is open and to open said inlet valve upon closure of said outlet valve.

5. Apparatus for accumulating accurately metered quantities of liquid and discharging it, comprising a reservoir having an inlet passage, an outlet passage and a float connection passage connected thereto, said outlet passage having a port opening within said reservoir adjacent the bottom thereof, said float connection passage having a port within said reservoir at the desired upper level of liquid therein, said reservoir being sealed except for the aforesaid passages so that during filling of said reservoir to the level of the inlet port of said float connection passage, said float connection passage constitutes an air vent, a normally closed solenoid actuated inlet valve in said inlet passage, a normally closed solenoid actuated outlet valve in said outlet passage, a float chamber located laterally and exteriorly of said reservoir, said float connection passage being connected to the lower part of said float chamber, a float in said chamber, a normally open switch in series with the solenoid of said inlet valve and located in position to be actuated to closed position upon a rise of said float, a timer switch for periodically energizing the solenoid of said outlet valve for a short interval to open said outlet valve to provide for emptying said reservoir by gravity flow, and a relay having its winding in series with the solenoid of said outlet valve and normally closed contacts in series with the solenoid of said inlet valve to prevent opening of said inlet valve while said outlet valve is open and to open said inlet valve upon closure of said outlet valve.

References Cited in the file of this patent
UNITED STATES PATENTS

| | | |
|---|---|---|
| 1,503,691 | Love | Aug. 5, 1924 |
| 1,907,001 | Peter | May 2, 1933 |
| 2,867,354 | Tanzola et al. | Jan. 6, 1959 |
| 2,893,595 | Hebard et al. | July 7, 1959 |
| 2,901,008 | Cavett et al. | Aug. 25, 1959 |